(12) United States Patent
Ten-Jet-Foei (10) Patent No.: US 9,783,029 B2
(45) Date of Patent: Oct. 10, 2017

(54) ROLLO ASSEMBLY AND OPEN ROOF CONSTRUCTION FOR A VEHICLE PROVIDED THEREWITH

(71) Applicant: Inalfa Roof Systems Group B.V., Oostrum (NL)

(72) Inventor: Suyanto Teri Wahiyu Ten-Jet-Foei, Helmond (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/154,688

(22) Filed: May 13, 2016

(65) Prior Publication Data

US 2016/0347156 A1 Dec. 1, 2016

(30) Foreign Application Priority Data

Jun. 1, 2015 (EP) .................................... 15170100

(51) Int. Cl.
*B60J 7/00* (2006.01)
*B60J 3/02* (2006.01)
(Continued)

(52) U.S. Cl.
CPC .............. *B60J 7/067* (2013.01); *B60J 1/2025* (2013.01); *B60J 7/0015* (2013.01)

(58) Field of Classification Search
CPC ...... B60J 7/0015; B60J 1/2025; B60J 1/2023; B60J 1/2019
(Continued)

(56) References Cited

U.S. PATENT DOCUMENTS

| 4,494,256 A | * | 1/1985 | Radtke | .................... | E04H 4/101 |
| | | | | | 160/265 |
| 5,159,967 A | * | 11/1992 | Ashley | ..................... | E06B 9/62 |
| | | | | | 160/189 |

(Continued)

FOREIGN PATENT DOCUMENTS

| DE | 10215678 A1 | 11/2003 |
| DE | 10336038 A1 | 3/2005 |
| EP | 1712389 A1 | 10/2006 |

OTHER PUBLICATIONS

European Search Report for corresponding European patent application No. 15170100.0, dated Nov. 23, 2015.

*Primary Examiner* — Dennis H Pedder
(74) *Attorney, Agent, or Firm* — Steven M. Koehler; Westman, Champlin & Koehler, P.A.

(57) ABSTRACT

A rollo assembly comprises a rollo screen having opposed forward and rearward edges and two opposed side edges extending in a longitudinal direction. A biased winding shaft supports the rollo screen at the rearward edge thereof. An operating beam connects to the forward edge of the rollo screen. Two guide members extend in said longitudinal direction and each define a guide channel for guiding an operating beam end. Near to each of the operating beam ends a first end of an elongate flexible drive member is connected, wherein each drive member, starting from a position near to the respective operating beam end, firstly extends in the longitudinal direction away from the winding shaft, next around a reversal member and finally in the longitudinal direction towards the winding shaft. Each drive member has a second end which has a stationary position. The reversal member is driven in said longitudinal direction.

22 Claims, 4 Drawing Sheets

(51) Int. Cl.
*B60J 7/06* (2006.01)
*B60J 1/20* (2006.01)

(58) Field of Classification Search
USPC .......................................... 296/214; 160/265
See application file for complete search history.

(56) References Cited

U.S. PATENT DOCUMENTS

| | | | | |
|---|---|---|---|---|
| 5,752,557 | A * | 5/1998 | Crider | E06B 9/13 160/121.1 |
| 5,960,847 | A * | 10/1999 | Crider | E06B 9/13 160/121.1 |
| 6,634,703 | B1 * | 10/2003 | De Gaillard | B60J 1/2027 160/120 |
| 7,204,548 | B2 * | 4/2007 | Wilms | B60R 13/0231 296/214 |
| 7,287,811 | B2 * | 10/2007 | Sanders | B60J 7/003 160/265 |
| 7,921,898 | B2 * | 4/2011 | Brioschi | E06B 9/68 160/265 |
| 8,905,468 | B2 * | 12/2014 | Kitani | B60J 3/0204 160/265 |
| 8,919,415 | B1 * | 12/2014 | Crider | E06B 9/42 160/241 |
| 2002/0195843 | A1 * | 12/2002 | Glasl | B60J 7/0015 296/214 |
| 2006/0241352 | A1 | 10/2006 | Sanders | |
| 2007/0056696 | A1 * | 3/2007 | Lin | B60J 1/2025 160/273.1 |

* cited by examiner

Fig. 4

ROLLO ASSEMBLY AND OPEN ROOF CONSTRUCTION FOR A VEHICLE PROVIDED THEREWITH

BACKGROUND

The discussion below is merely provided for general background information and is not intended to be used as an aid in determining the scope of the claimed subject matter.

The invention in a first aspect relates to a rollo assembly, comprising a rollo screen for cooperation with an opening, said rollo screen having opposed forward and rearward edges extending in a transversal direction and two opposed side edges extending in a longitudinal direction, a winding shaft which is rotatable for winding on or winding off the rollo screen at the rearward edge thereof for determining the amount in which the rollo screen covers said opening, which winding shaft is biased for winding on the rollo screen, an operating beam connected to the forward edge of the rollo screen and defining two opposite operating beam ends, and two guide members extending in said longitudinal direction and each defining a guide channel for guiding a respective one of the operating beam ends.

In such a rollo assembly the operating beam is driven for moving the rollo screen to a desired position (while winding the rollo screen on or off the winding shaft) for in a desired amount covering or freeing the opening. It is for example possible that such a movement of the operating beam is carried out manually by engaging a dedicated part of the operating beam (such as, for example, a central grip area thereof). In other embodiments the rollo assembly comprises drive means for driving the operating beam (in which case, for example, push and/or pull cables are provided extending in the guide members and at a first end engaging the operating beam ends and at a second end being driven by an electric motor).

When the rollo assembly is to be used with a large opening, specifically an opening having a large dimension in the longitudinal direction, the operating beam (with attached forward rollo screen edge) will have to travel over a large distance between the position in which the rollo screen fully frees the opening (rollo screen maximally wound on the winding shaft, fully open position) and the position in which the rollo screen fully covers the opening (rollo screen maximally wound off from the winding shaft, fully closed position). Given a defined driving speed for the operating beam (for example in the event of using drive means such as an electric motor) this travel requires a substantial amount of time.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

The rollo assembly near to each of the operating beam ends a first end of an elongate flexible drive member is connected, wherein each drive member, starting from the position near to the respective operating beam end, firstly extends in the longitudinal direction away from the winding shaft, next around a reversal member and finally in the longitudinal direction towards the winding shaft, wherein each drive member has a second end which has a stationary position and wherein the reversal member is driven for a translation in said longitudinal direction. An advantage of the rollo assembly is that the time needed to obtain the fully open and the fully closed positions is reduced substantially.

Because a drive member has a second end with a stationary position (such second end, for example, may be attached to a stationary part), driving the reversal member with a first speed will lead to a movement of the first end of the drive member in the same direction with a higher second speed twice the first speed. As a result the opening or closing movement of the operating beam with rollo screen also will occur with said higher second speed. This allows to halve the time needed for a desired movement of the rollo screen.

It is noted that the expression "again in the longitudinal direction towards the winding shaft" does not mean that the drive member extends up to the winding shaft, but merely is intended to define the sense of the direction along said longitudinal direction. Further it is noted that the expression "in the longitudinal direction" also intends to include directions of extension of the drive member (both in the one and in the opposite sense away from and towards the winding shaft, respectively) slightly differing from said longitudinal direction (thus including small angles therewith).

In one embodiment of the rollo assembly the design of each of the elongate flexible drive members is such that the reversal members are positioned substantially halfway the opening, as seen in said longitudinal direction, when the rollo screen is wound on the winding shaft for entirely freeing the opening.

In this aspect the design of the elongate flexible drive members may include features such as the length and position or direction of the drive members.

Due to such a design, it can be assured that the forward edge of the rollo screen with the operating beam will just about arrive at the reversal members when the rollo screen reaches its fully closed position. Or, otherwise stated, both the reversal members and the operating beam will reach a forward edge of the opening substantially simultaneously. This at one hand minimises the dimensions of the rollo assembly. If, for example, the reversal members would be positioned further away from the winding shaft than halfway the opening, as seen in said longitudinal direction, when the rollo screen is wound on the winding shaft for entirely freeing the opening, the reversal members would have to move a substantial distance beyond the forward edge of the opening for moving the rollo screen to its entirely closed position. On the other hand, if the reversal members would be positioned closer to the winding shaft than halfway the opening, as seen in said longitudinal direction, when the rollo screen is wound on the winding shaft for entirely freeing the opening, the operating beam with the forward edge of the rollo screen at some point already would reach the reversal members before the rollo screen reaches its fully closed position, and any further movement would be impeded because the operating beam cannot move around the reversal member.

In another embodiment each reversal member is driven by a push/pull cable which is driven by a motor. Such a motor preferably will comprise an electric motor.

It is noted that in such an embodiment the motor and push/pull cable used could be the same as otherwise used in a standard situation in which the operating beam is directly driven by an electric motor using such cables. Generally such electric motors have sufficient torque to enable the use with reversal members.

In one embodiment of the rollo assembly according to present invention each reversal member is provided with a guide part guided by a corresponding one of the guide members. In such an embodiment the guide members, which originally are provided for guiding the operating beam (and in most cases also for guiding the opposite side edges of the rollo screen), are used also for guiding the reversal members.

It is possible, then, that each guide member defines two separate guide channels, a first one of which defines the guide channel for a respective operating beam end and a second one of which defines a guide channel for the guide part of a respective reversal member. Thus, the operating beam and the reversal members use different guide channels (which may be positioned alongside each other). Because the distance over which the reversal members move substantially is half the distance over which the operating beam moves, the length of the guide channels for the guide parts of the reversal members may be shorter (for example provided only over part of the length of the guide members). For example, such guide channels for the guide parts of the reversal members may be embodied as separate guide channels which are attached to a state of the art guide member, but it is conceivable too that those guide channels are an integral part of a guide member.

As an alternative, however, it also is possible that each guide member defines a single guide channel, both for a respective operating beam end and for the guide part of a respective reversal member.

In one embodiment each reversal member comprises a reversal roller, pulley or alike which is rotatable around an axis extending transversally. Such a roller, pulley or alike may guide the drive member with nearly no friction.

As an alternative each reversal member may have a surface which is provided with a curved low friction guide channel for guiding the respective elongate flexible drive member. Such an embodiment constructively is more simple than the provision of a roller, pulley or alike, but the friction experienced by the drive member will be larger.

Each elongate flexible drive member may comprise a cable, rope or belt.

In one embodiment each elongate flexible drive member is directly attached to a corresponding operating beam end.

In another embodiment, however, each elongate flexible drive member is directly attached to the rollo screen (wherein the position of attachment, however, is located near to a corresponding operating beam end).

Then it is conceivable that each elongate flexible drive member is an extension of the material of which the rollo screen is made; basically this means that the drive member is an integral part of the rollo screen.

In an alternative embodiment each elongate flexible drive member is an extension of a side guidance member of the rollo screen (such a side guidance member may have a function in keeping a corresponding side edge of the rollo screen in a corresponding guide channel, but also may be used to relocate a side edge in such a guide channel after being forced out of it by accident).

In a second aspect the invention relates to an open roof construction for a vehicle, comprising a roof opening in a stationary roof part, a movable panel for opening and closing said roof opening and a rollo assembly according to the present invention positioned below said roof opening. In such an open roof construction the roof opening defines the opening with which the rollo screen cooperates.

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENT

Figure 1:
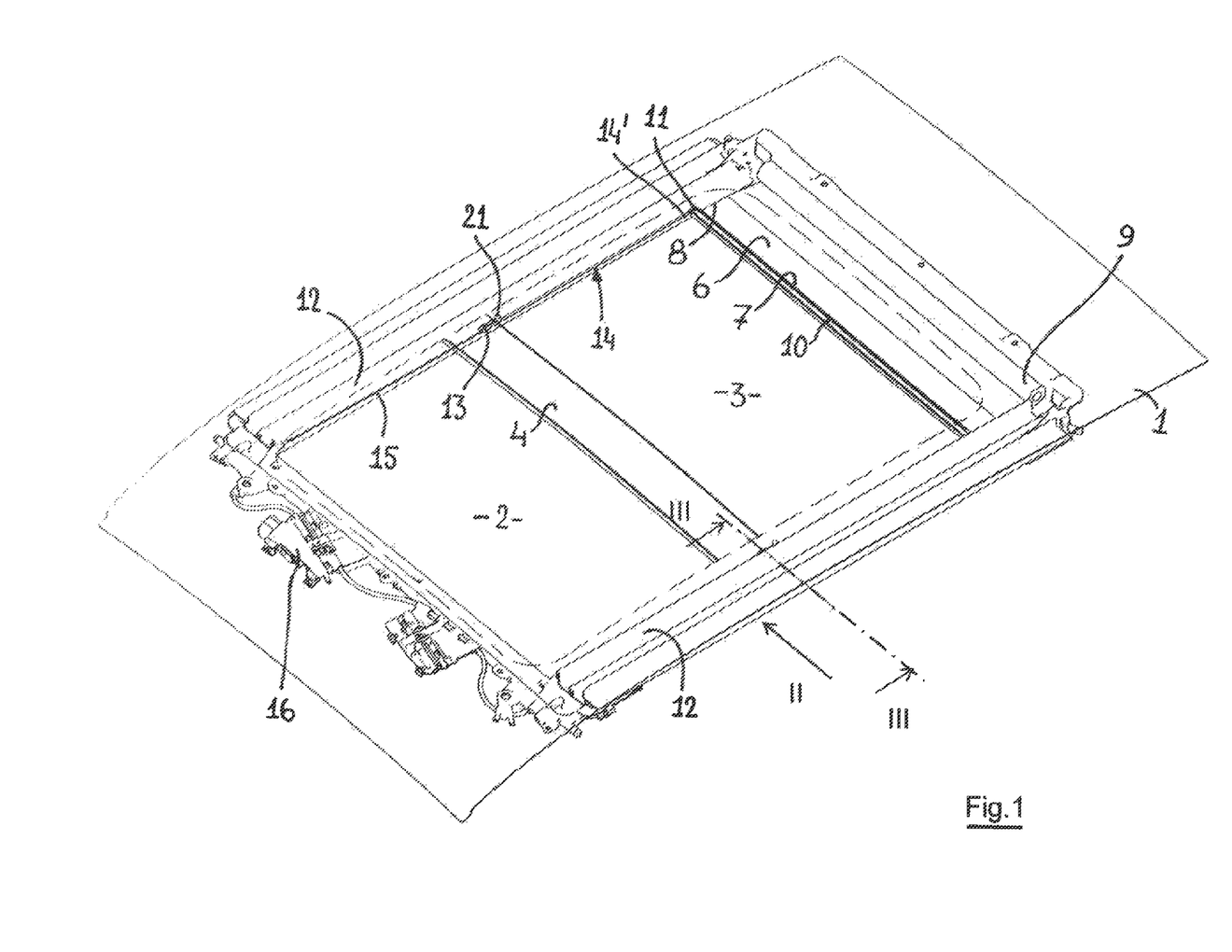
FIG. 1 in perspective and schematically shows an open roof construction with rollo assembly.

Firstly referring to FIG. 1 an open roof construction for a vehicle is illustrated. Said open roof construction comprises a roof opening in a stationary roof part 1. The roof opening is divided into a forward roof opening 2 and a rearward roof opening 3 by a divider 4. As illustrated in broken lines in FIG. 2A, said roof openings 2 and 3 may be opened and closed by movable panels 5. The manner in which these panels 5 move is not important for understanding the present invention and thus will not be explained further. It is sufficient to state that this may occur in many different ways known from the state of the art.

Below the roof openings 2 and 3 and for cooperation therewith a rollo assembly is provided. Said rollo assembly comprises a rollo screen 6 having a forward edge 7 and an opposed rearward edge (not visible) extending both in a transversal direction. The rollo screen 6 further comprises two opposed side edges 8 extending in a longitudinal direction (only one of which is visible in FIG. 1). A winding shaft 9 is provided which is rotatable for winding on or winding off the rollo screen 6 at the rearward edge thereof for determining the amount in which the rollo screen 6 covers said openings 2, 3. As is generally known from the state of the art, the winding shaft is biased (e.g. spring 9' in FIG. 2A) in a rotational direction for winding on the rollo screen 6.

An operating beam 10 is connected to the forward edge 7 of the rollo screen 6 and defines two opposite operating beam ends 11 (only one of which is visible in FIG. 1). At opposite longitudinal sides of the roof openings 2, 3 two guide members 12 are positioned which extend in said longitudinal direction and which each define a guide channel 17 for guiding a respective one of the operating beam ends 11.

It is noted that the guide members 12 also may serve for guiding the side edges 8 of the rollo screen.

The rollo assembly further comprises reversal members 13 (only one is illustrated) which also are guided for a longitudinal movement in said guide members 12. To each of the operating beam ends 11 a first end 14' of an elongate flexible drive member 14 is connected, wherein each drive member 14, starting from the respective operating beam end 11, firstly extends in the longitudinal direction away from the winding shaft 9, next around the reversal member 13 and finally in the longitudinal direction towards the winding shaft 9. Each drive member 14 has a second end 14" which has a stationary position (for example being attached to a stationary member 21 of the open roof construction).

The reversal member 13 is driven for a translation in said longitudinal direction by means of a push or pull cable 15 which in the illustrated embodiment is driven by an electric motor 16.

Figure 2A:
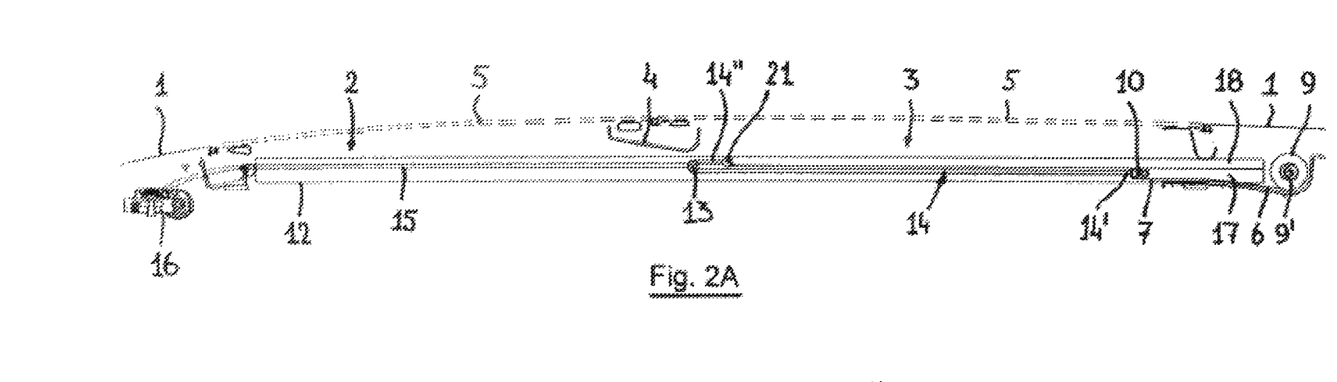
FIG. 2A illustrates a schematic side elevational view according to II in FIG. 1.
Figure 2B:
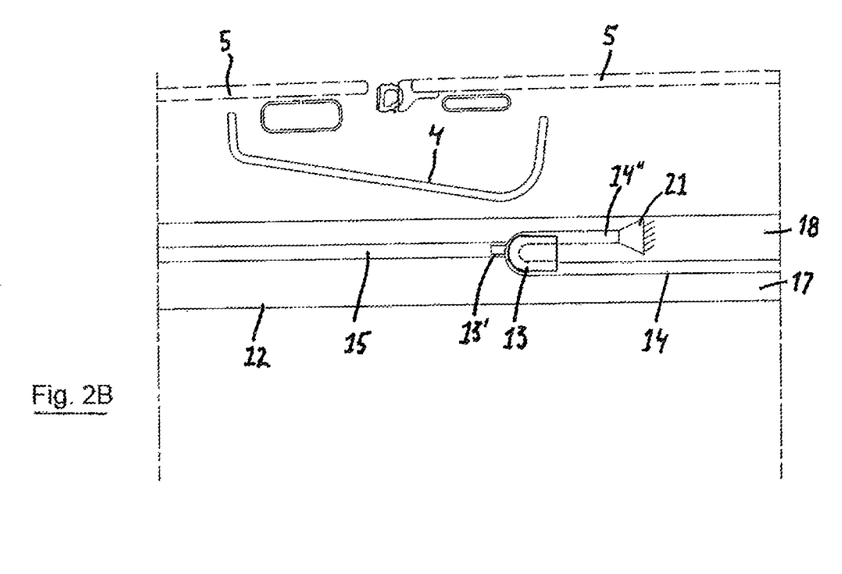
FIG. 2B on a larger scale shows a part of FIG. 2A.

In FIGS. 2A and 2B the guide member 12 has been illustrated comprising two adjacent guide channels 17 and 18. Guide channel 17 is intended for guiding a respective operating beam end 11, whereas guide channel 18 is intended to cooperate with a guide part 13' of the reversal member 13. This also has been illustrated in FIG. 3. In other embodiments not illustrated said guide channels 17 and 18 could be combined into a single guide channel.

The design of each of the elongate flexible drive members 14 is such that the reversal members 13 are positioned substantially halfway the combined lengths of the forward and rearward roof openings 2, 3 when the rollo screen 6 is wound on the winding shaft 9 for entirely freeing the roof openings 2, 3 (the situation illustrated in FIGS. 2A and 2B). In the event that there would be only one single roof opening, this would mean that the reversal members 13 are positioned substantially halfway along the roof opening, as seen in said longitudinal direction, when the rollo screen 6 is wound on the winding shaft 9 for entirely freeing the roof opening.

Figure 3:
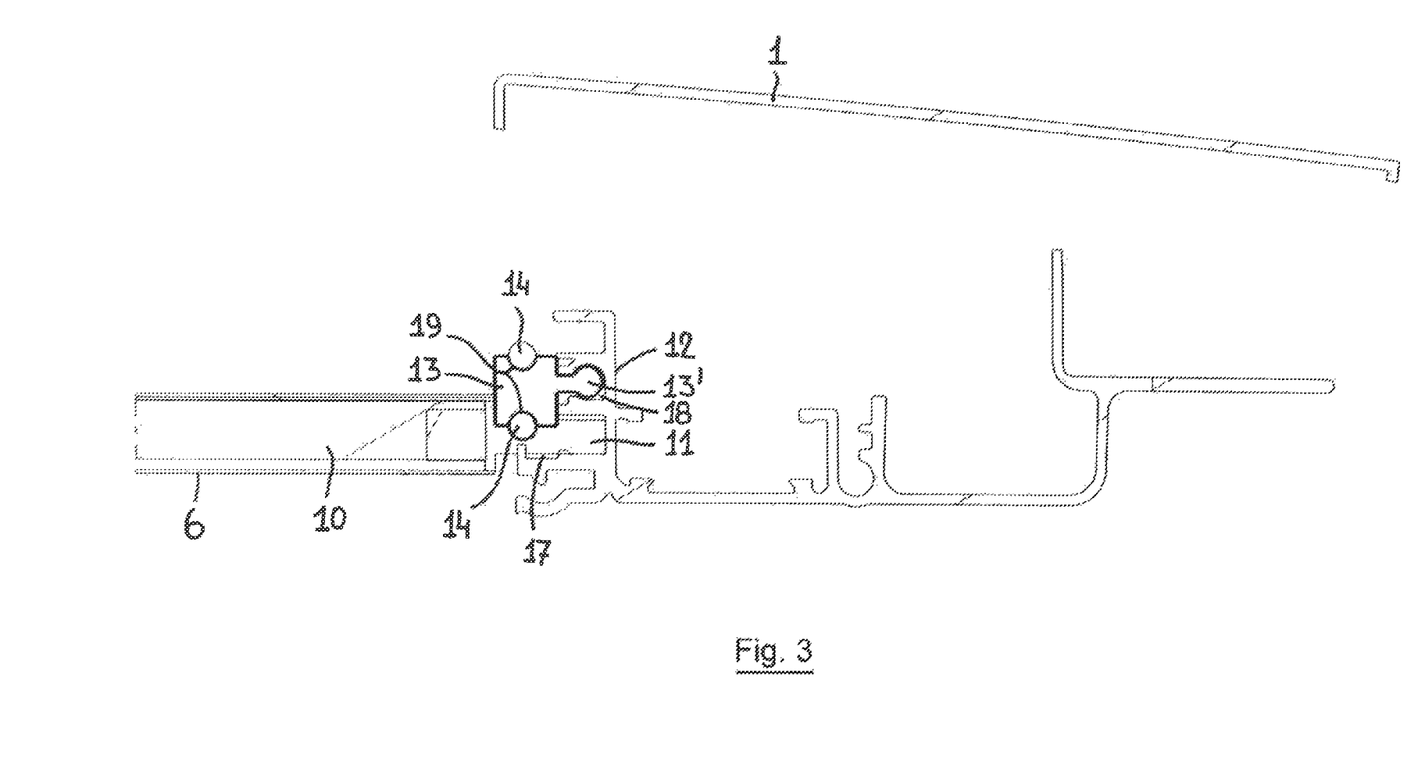
FIG. 3 illustrates a section according to III-III in FIG. 1 on a larger scale.

In the embodiment best illustrated in FIGS. 2A, 2B and 3 the reversal member 13 is provided with a stationary curved (i.e. partly circumferential) guide channel or groove 19 which provides low friction to the drive member 14 that will slide therein. In such an embodiment the reversal member 13 does not have moving parts and thus is of a rather simple but reliable design. The part of the drive member 14 illustrated at the top in FIG. 3 leads to the second end 14" which is stationary, and the lower part of the drive member 14 leads to the first end 14' which is connected to the operating beam end 11.

Figure 4:
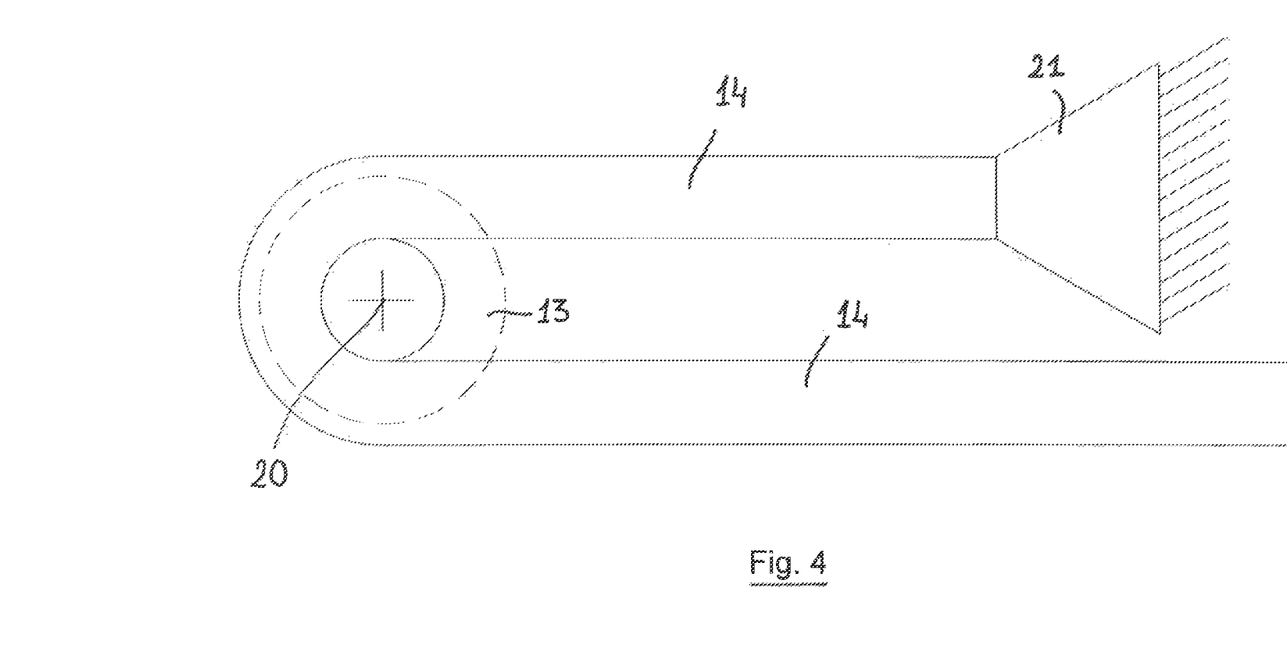
FIG. 4 illustrates a roller.

In an alternative design (illustrated in FIG. 4) the reversal member 13 (schematically indicated in broken lines) comprises a reversal roller, pulley or alike which is rotatable around an axis 20 extending transversally. In such an embodiment substantially no frictional forces will be generated between the drive member 14 and the reversal member 13, but this design is somewhat more complicated and thus costlier.

Each elongate flexible drive member 14 may comprises a cable, rope or belt. The specific design may depend on the required characteristics and operational circumstances.

Figure 5:
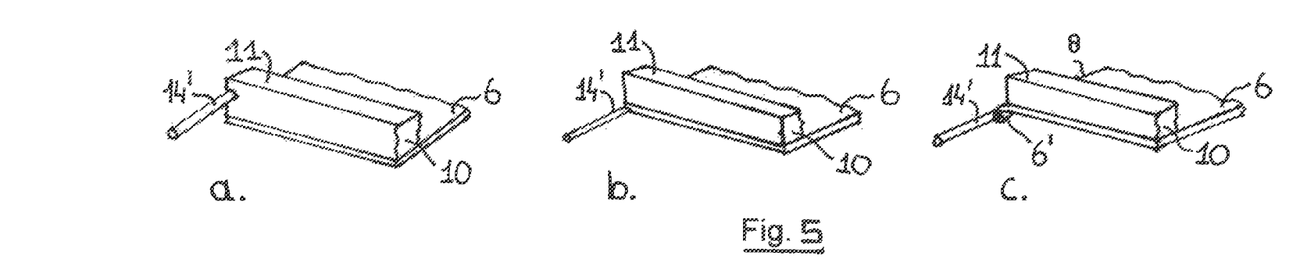
FIG. 5 shows three different ways of attaching a drive member.

In the embodiment schematically represented in part in FIG. 5a a respective first end 14' of an elongate flexible drive member is directly attached to a corresponding operating beam end 11 of the operating beam 10.

In another embodiment shown in FIG. 5b, however, each elongate flexible drive member with its first end 14' is directly attached to the rollo screen 6 (wherein the position of attachment, however, is located near to a corresponding operating beam end 11).

Then it is conceivable that each elongate flexible drive member 14 (14') is an extension of the material of which the rollo screen 6 is made; basically this means that the drive member is an integral part of the rollo screen.

In an alternative embodiment (see FIG. 5c) the first end 14' of each elongate flexible drive member is an extension of a side guidance member (only schematically represented as 6') of the rollo screen 6 (such a side guidance member 6' may have a function in keeping a corresponding side edge 8 of the rollo screen 6 in a corresponding guide channel, but also may be used to relocate a side edge in such a guide channel after being forced out of it by accident).

The operation of the rollo assembly now will be explained while referring to FIG. 2A. In the situation illustrated in FIG. 2A the winding shaft 9, which is biased by the spring member 9', has wound on the rollo screen 6 such that the roof openings 2, 3 are fully free to the extent allowable by the rollo screen 6 (in this respect the panels 5 are left out of consideration). The illustrated position of the operating beam 10 (or its ends 11) may be determined by stop members not illustrated.

In a standard rollo assembly the cable 15 of the electric motor 16 would be connected directly to the operating beam 10, and the speed with which the operating beam 10 would slide in the guide channel 17 of the guide member 12 would equal a given speed of the cable 15.

According to an aspect of the invention, however, when the cable 15 drives the reversal member 13 with said given speed, the operating beam 10 will move with twice said speed. As a result the rollo screen 6 needs less time to reach a desired position, for example a position in which it fully covers both roof openings 2, 3.

With respect to the illustrative embodiment having two roof openings 2, 4, because the reversal member 13 is positioned substantially halfway the total combined longitudinal length of the roof openings 2, 3 when the rollo screen 6 is in the fully open position, the rollo screen 6 (specifically the forward edge 7 thereof attached to the operating beam 10) will reach the fully closed position substantially simultaneously with the moment that the reversal member 13 has travelled over the total longitudinal length of the forward roof opening 2.

Moving the cable 15 again in the opposite sense (basically towards the winding shaft 9) will lead to a movement of the rollo screen 6 in said opposite sense because of the bias of the winding shaft 9, again with twice the speed of the cable 15 (or reversal member 13).

In the illustrated embodiment the cable 15 will function as a push/pull cable

Although in the illustrated embodiments the section of the drive member 14 between its first end 14' at the operating beam end 11 and the reversal member 13 and the section between its second end 14" and the reversal member 13 are shown as extending in the longitudinal direction (basically in parallel to the direction of movement of the operating beam 10), said drive member sections also could extend in slightly different directions. Further it is conceivable too that the direction in which the reversal members 13 are moved, is not completely in parallel to the direction in which the operating beam 10 moves.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. Rollo assembly, comprising:
   a rollo screen configured to open and close an opening at least partially with longitudinal movement thereof, said rollo screen having opposed forward and rearward edges extending in a transversal direction to the longitudinal movement and two opposed side edges extending in a longitudinal direction parallel to the longitudinal movement;
   a winding shaft joined to rearward edge of the rollo screen and configured to rotate to wind on or wind off the rollo screen at the rearward edge thereof for determining an amount in which the rollo screen covers said opening, the winding shaft being biased so as to wind on the rollo screen;
   an operating beam connected to the forward edge of the rollo screen and defining two opposite operating beam ends;

two guide members extending in said longitudinal direction and each defining a guide channel configured to guide a respective one of the operating beam ends;

two elongate flexible drive members and two reversal members, each drive member having a first end joined proximate each of the operating beam ends, wherein each drive member, starting from a position near to the first end, firstly extends in the longitudinal direction away from the winding shaft, next around a reversal member and finally in the longitudinal direction towards the winding shaft, wherein each drive member has a second end which has a stationary position and wherein the reversal members are configured to move in said longitudinal direction.

2. The rollo assembly according to claim 1, wherein the reversal members are positioned substantially halfway along the opening, as seen in said longitudinal direction, when the rollo screen is wound on the winding shaft for entirely freeing the opening with respect to the rollo screen.

3. The rollo assembly according to claim 1, and further comprising a push/pull cable connected to each reversal member.

4. The rollo assembly according claim 1, wherein each reversal member is provided with a guide part configured to be guided by a corresponding one of the guide members.

5. The rollo assembly according to claim 4, wherein each guide member defines two separate guide channels, a first guide channel configured to guide a respective operating beam end and a second guide channel configured to guide part of a respective reversal member.

6. The rollo assembly according to claim 1, wherein each reversal member comprises a roller configured to rotate around an axis extending transversally.

7. The rollo assembly according to claim 1, wherein each reversal member has a surface which is provided with a curved low friction guide channel configured to guide the respective elongate flexible drive member.

8. The rollo assembly according to claim 1, wherein each elongate flexible drive member comprises a cable.

9. The rollo assembly according to claim 1, wherein each elongate flexible drive member is directly attached to a corresponding operating beam end.

10. The rollo assembly according to claim 1, wherein each elongate flexible drive member is directly attached to the rollo screen.

11. The rollo assembly according to claim 10, wherein each elongate flexible drive member is an extension of a material of which the rollo screen is made.

12. The rollo assembly according to claim 10, wherein each elongate flexible drive member is an extension of a side guidance member of the rollo screen.

13. An open roof construction for a vehicle, comprising a first roof opening in a stationary roof part, a rollo screen configured to open and close the first roof opening at least partially with longitudinal movement thereof, said rollo screen having opposed forward and rearward edges extending in a transversal direction to the longitudinal movement and two opposed side edges extending in a longitudinal direction parallel to the longitudinal movement;

a winding shaft joined to rearward edge of the rollo screen and configured to rotate to wind on or wind off the rollo screen at the rearward edge thereof for determining an amount in which the rollo screen covers said first roof opening, the winding shaft being biased so as to wind on the rollo screen;

an operating beam connected to the forward edge of the rollo screen and defining two opposite operating beam ends;

two guide members, each guide member extending in said longitudinal direction and each defining a guide channel configured to guide movement of a respective one of the operating beam ends; and a drive configured to displace the operating beam in a longitudinal direction, the drive comprising:

an elongate flexible drive member having a first end connected to the operating beam and a second end;

a reversal member joined to the elongate flexible drive member between the first and second ends;

a push/pull cable joined to the reversal member to move the reversal member in a longitudinal direction, wherein the drive is configured to move the operating beam at a rate faster than a rate of movement of the reversal member.

14. The open roof construction according to claim 13, wherein the reversal member is positioned substantially halfway along the first roof opening, as seen in said longitudinal direction, when the rollo screen is wound on the winding shaft for entirely freeing the first roof opening with respect to the rollo screen.

15. The open roof construction according to claim 13, and further comprising a motor connected to the push/pull cable.

16. The open roof construction according to claim 13, wherein the reversal member is provided with a guide part configured to be guided by the guide member.

17. The open roof construction according to claim 13, wherein the stationary roof part comprises a second roof opening, the rollo screen of length to close the first and second roof openings at least partially.

18. The open roof construction according to claim 13 wherein the reversal member comprises a roller configured to rotate about an axis transverse to the longitudinal direction.

19. The open roof construction according to claim 13 wherein the reversal member is non-rotatable and includes guide channels configured to guide the elongate flexible drive member.

20. A method for opening and closing at least partially a roof opening in a stationary roof part in a vehicle, the method comprising:

providing a rollo screen configured to open and close the roof opening at least partially with longitudinal movement thereof, said rollo screen having opposed forward and rearward edges extending in a transversal direction to the longitudinal movement and two opposed side edges extending in a longitudinal direction parallel to the longitudinal movement, a winding shaft joined to rearward edge of the rollo screen and configured to rotate to wind on or wind off the rollo screen at the rearward edge thereof for determining an amount in which the rollo screen covers said roof opening, an operating beam connected to the forward edge of the rollo screen and defining two opposite operating beam ends each guided in a guide channel, and a drive configured to displace the operating beam in a longitudinal direction, the drive comprising, an elongate flexible drive member having a first end connected to the operating beam and a second end, a reversal member joined to the elongate flexible drive member between the first and second ends; and moving the reversal member in a longitudinal manner so as to cause movement of the operating beam at a rate faster than a rate of movement of the reversal member.

21. The method of claim 20 and further comprising biasing the winding shaft so as to wind on the rollo screen.

22. The rollo assembly according claim 2, wherein each reversal member is provided with a guide part configured to be guided by a corresponding one of the guide members.

* * * * *